INVENTORS.
Edward Jacobson
Abraham Siegelman
BY
Silverman, Mullin & Cass
attorneys

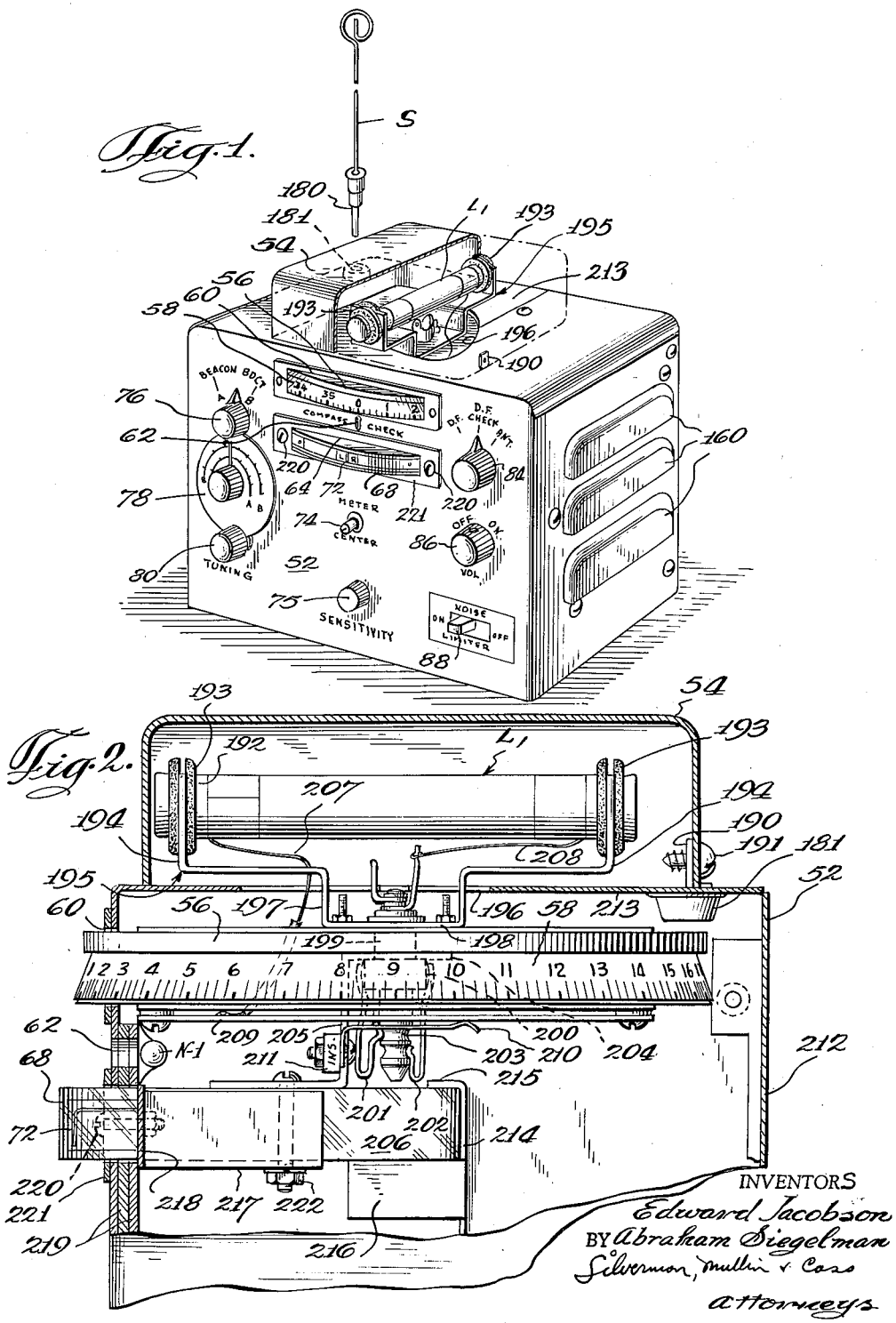

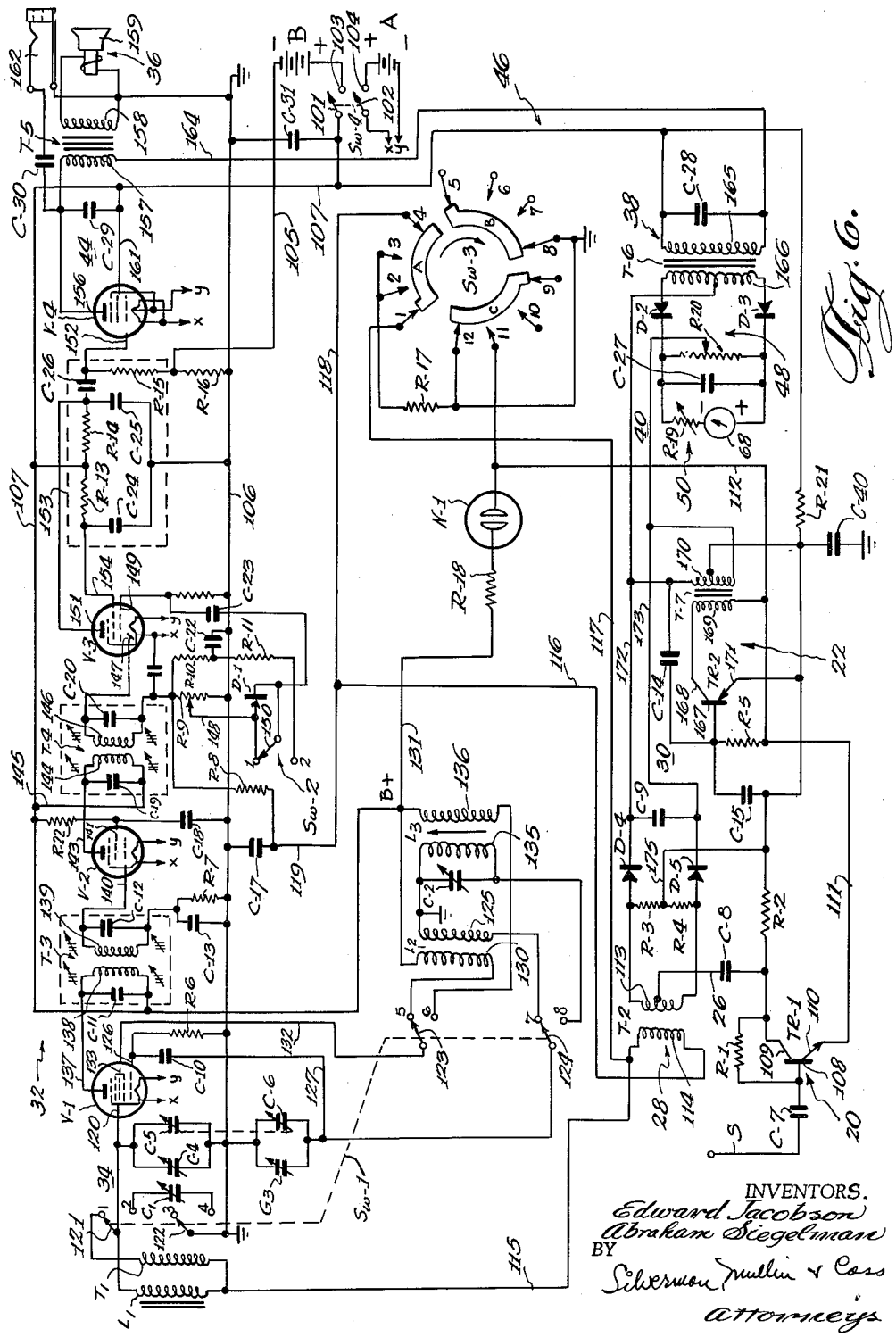

United States Patent Office 3,020,548
Patented Feb. 6, 1962

3,020,548
PORTABLE RADIO DIRECTION FINDER
Edward Jacobson and Abraham Siegelman, Morton Grove, Ill., assignors to Allen-Bradford, Inc., Chicago, Ill.
Filed May 19, 1958, Ser. No. 736,113
23 Claims. (Cl. 343—121)

This invention relates generally to radio direction finders and more particularly is concerned with a portable radio direction finder for use in aeronautical and marine navigation.

The basic principles governing radio direction finding through the combining of the outputs of a sensing antenna and a loop antenna are well-known, and in fact, many radio direction finders have been made and are used applying these principles in varying fashions. It has never been deemed feasible, however, to the best of our knowledge to apply these principles to the construction of a highly compact, highly sensitive, completely self-containing portable radio direction finder which is transportable and hence can be used without the slightest change whatsoever in airplanes or watercraft.

Through the offices of this invention, for the first time, such a completely portable radio direction finder is practical and can be made to perform substantially all of the functions and operations heretofore performed only by apparatus and equipment having substantially greater cost, occupying substantially more volume, requiring great skill to install and operate, using high power and complex circuitry, and in general being totally unsatisfactory from many standpoints for use by amateur pilots, small craft operators, and the like.

The primary object of the invention is to provide a radio direction finder having the above described advantages, which are principally: complete portability with respect to size, weight and self-contained power supply; economical manufacture and consequent low price; simplicity of structure and hence ease of operation; and ability to perform substantially all of the functions of the higher priced and more complex non-portable direction finders.

The invention is accomplished through the use of novel circuitry and mechanical features, the provision of which are included in the objects of this invention, but it is believed that a short enumeration of the most important functional uses and features of construction and operation of the apparatus will assist in an understanding of the invention as described hereinafter, and will enable those skilled in the art to appreciate the attributes and accomplishments achieved by the invention:

(a) The apparatus can be operated from either the beacon radio frequencies (200 kcs. to 400 kcs.) or from the standard broadcast radio frequencies (540 kcs. to 1620 kcs.) and can receive signals on both of these bands for informational or entertainment use.

(b) The apparatus, when tuned to a given transmitted frequency, can indicate the direction to the source of that frequency by means of a left-right indicator instrument. The rotation of the loop antenna which is mounted to the compass rose gives the proper bearing, enabling accurate position fixing.

(c) The apparatus when tuned to a desired signal can be used for homing on the source of that signal through the use of the right-left indicator instrument. Ambiguity in ascertaining whether a source is forward of the apparatus or rearward of the apparatus is readily eliminated by the direction of deflection of the needle of the right-left indicator instrument for movement of the craft.

(d) The apparatus when tuned to a particular signal can be used as an aural homing device, using only the loop antenna, with the direction of the source being indicated by minimum signal.

It will become apparent from the description that follows that the invention provides many objects and advantages which are not set forth hereinabove for reasons of space. The construction and arrangement of parts, for example, the manner of mounting the loop antenna and compass rose, provide novel features which go toward enabling the apparatus to be made as small and compact as it is. The circuitry is novel in the respect that it provides the signal relationships to eliminate ambiguity during direction finding, and the circuits which accomplish functions known are novel in that they use new and unusual arrangements of components performing with more efficiency than heretofore. Many variations are possible in connection with the invention as described in connection with a preferred embodiment set forth in detail hereinafter without departing from the spirit or scope of the invention.

The drawings illustrate the preferred embodiment and include diagrammatic illustrations of the response of the apparatus in order to explain the operation thereof. Likewise, circuit diagrams are used in order to illustrate the electrical circuitry of the apparatus.

In the said drawings:

FIG. 1 is a perspective view of a complete radio direction finder constructed in accordance with the invention, the same being shown with portions broken away in order to illustrate certain details of the invention.

FIG. 2 is a sectional view taken through the compass rose and the ferrite core antenna, showing especially the mounting of the rose for ready rotation thereof.

FIG. 6 is a fairly detailed circuit diagram of the apparatus of the invention.

The invention herein depends primarily upon the principle of compared cardioid antenna patterns which has been used in direction finders for the purpose of indicating the heading of an aircraft or watercraft with respect to a source of a signal. The operation of this principle will be explained first in connection with FIGS. 4 and 5.

The apparatus of the invention utilizes two antennas, one of which is a simple vertical antenna which is designated S in FIG. 6 and comprises a so-called sensing antenna which is non-directional, and the other of which is a so-called loop antenna, designated $L_1$ in FIG. 6 and which has the familiar figure 8 response characteristic considered in a horizontal plane. The antenna $L_1$ in the apparatus of this invention comprises a so-called ferrite loop stick, in which there is a highly paramagnetic elongate core of sintered iron wound with fine wire, which exhibits the same characteristics as the well-known air core loop but in a fraction of the space. The minimum signal is received from a ferrite core antenna when the axis of the core points to the source of the signal, this being the equivalent of the axis of an air core loop passing through the source.

Figure 4:
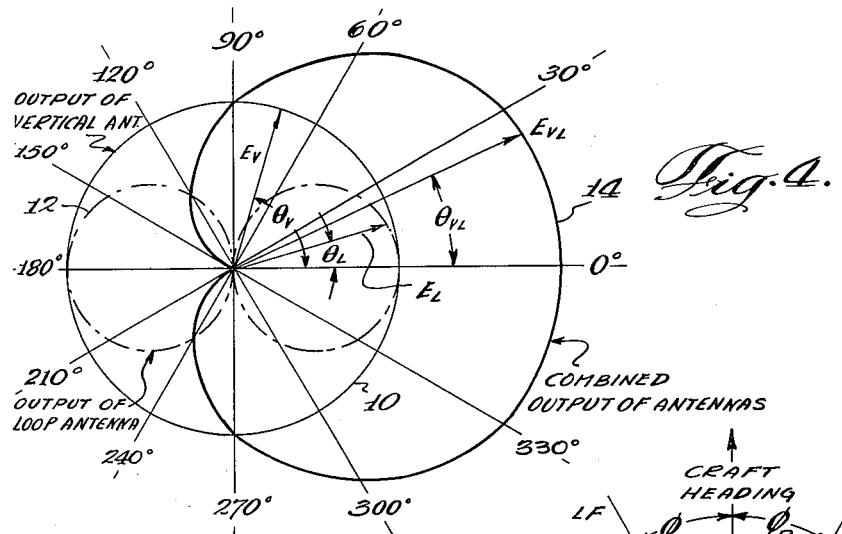
FIGS. 4 and 5 are polar diagrams of antenna characteristics intended for use in explaining the directional response of the apparatus of the invention.

In FIG. 4 there are illustrated polar diagrams of the signal responses of two antennas, one a loop antenna and the other a sense or vertical antenna. The antennas are both considered on the basis of the same location and same signal strength of the transmitting station. Since the sense or vertical antenna responds with the same signal output for all directions, its response is represented by the circular pattern 10 which is actually a graph of station bearing versus signal output. This latter is represented by the amplitude of the signal measured from the center of the diagram to the points on the graph 10 as shown at $E_v$. The direction of the station is indicated by the angle $\theta_V$. Obviously the amplitude is the same for any direction. The response is determined by rotating the antenna with the source fixed.

The response of the loop antenna is indicated by the broken line figure 8 graph of FIG. 4. As will be seen, this graph 12 has two maxima and two minima, and the amplitude $E_L$ varies accordingly with angle $\theta_L$. This antenna is not as utilitarian as desired because of the ambiguity of any given output. There are two possible directions which the source might be for any signal. Obviously the vertical antenna is useless as a direction finder since the only change in amplitude occurs with change in signal strength.

Combining signals from two antennas provides a response which is unambiguous, although not as useful as required for accurate direction finding. In FIG. 4 the combined response of the two antennas is shown to be a cardioid graph 14. The cardioid configuration provides one maximum toward the source, i.e., on the vector 0° and a minimum away from the source, on the vector 180°, with the intervening amplitudes being measured by the vector $E_{vL}$ at angles $\theta_{vL}$. The combining of the signals from the antennas is done electrically in the apparatus, as will be explained, and the pattern may be obtained merely by rotating the loop antenna, disregarding the switching oscillator which will be described in connection with the details of the apparatus. The signals induced in the respective antennas are presumed to be in phase for the generation of the characteristic cardioid response 14 of FIG. 4, but conceivably they could be out of phase one with the other, say by 180°, in which case, instead of the cardioid maximum being at 0° bearing, it would occur at 180° bearing.

Figure 5:
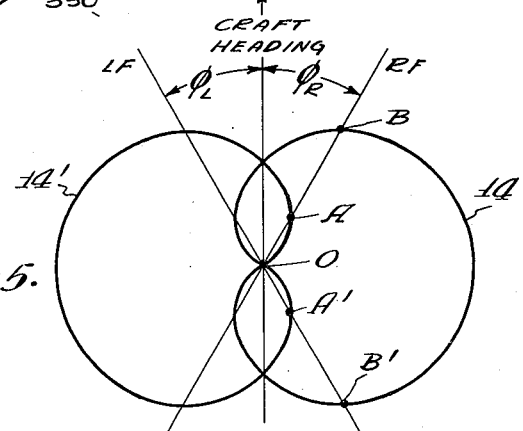

In FIG. 5 there is illustrated a diagram showing the response of a pair of antennas, one being a loop antenna and the other being a vertical antenna, in which the phase between the signals of the two antennas is being switched 180° at a predetermined repetitive rate. As shown, there will be two cardioids overlapped, one being designated 14 and the other 14'. In other words, there will be two receiver directivity patterns for each condition of phase relationship in the two antennas, and these patterns are superimposed on one another. This arrangement enables an unambiguous right-left directivity to be obtained as will be described. It should be appreciated that the cardioid patterns are needed because, as will be seen, the arrangement is such that when the apparatus is pointed directly at the source of the signal, the loop antenna will be at its minimum signal orientation. In the case of the air core loop, this would be with the axis of the loop pointed at the station, and in the case of the ferrite core antenna, the axis of the core is pointing at the station.

Consider the apparatus with the loop antenna aligned to coincide with the front and the rear axis of the device. In a watercraft, for example, the apparatus would be aligned with the keel, and the compass rose upon which the ferrite core is mounted is set at 0°. With the phase shifting oscillator operating, the pattern is as shown in said FIG. 5. Consider first a source of radio frequency signals which is off the right and front of the craft, on the line RF drawn through the center O of the diagram. The line intersects the pattern or graph 14 at B and hence the amplitude of the signal produced in the receiver will be proportional to the vector OB, when the antennas are receiving in phase with one another. When out of phase, however, the signal which the receiver will receive will be proportional to the vector OA, since this is the point at which the line RF intersects the graph 14'.

The output of the receiver is substantially proportional to the amplitude of the signal which is applied at its input. With the continuous phase switching occurring, the output which the receiver can produce will consist of two parts, which in the case of the signal being to the right of the craft, will consist of a large signal corresponding to OB and a small signal corresponding to OA. If these signals are applied to means which can detect the relative difference between the two signals in terms of which one is the greater and apply it to a suitable bridge, the bridge can be caused to unbalance one way or the other depending upon which of the signals is the greater. In this way, a sense of right or left can be achieved, with the detector of the bridge comprising the necessary means to show which way the signal originates.

With such an apparatus, it is relatively easy to use the compass rose to ascertain the direction of the source, or to turn the craft to "home" on the source. As will be obvious from this explanation, the deflection of the right-left meter of the apparatus to the right will be governed by the angle $\phi_R$ and the deflection to the left will be governed by the angle $\phi_L$.

The existence of a source of signal to the right and rear of the craft from the direction indicated by the line RR will cause the identical deflection of the meter to the right. This does not pose any serious problem of ambiguity, because if the craft is turned a small amount to the right, if the signal source is from the front and right of the craft, i.e., the direction RF, the vector OB will decrease, and the vector OA will increase. This will have the effect of decreasing the relative difference between the signals produced on alternate cycles of the oscillator switching the phase. Obviously the meter needle will swing toward its center, i.e., to the left. If however, the source of the signal were to the right and rear, i.e., coming from the direction RR, when the craft is turned to the right, the vector OB' becomes larger and the vector OA' becomes smaller with the net result that the meter needle will swing further right.

Figure 3:
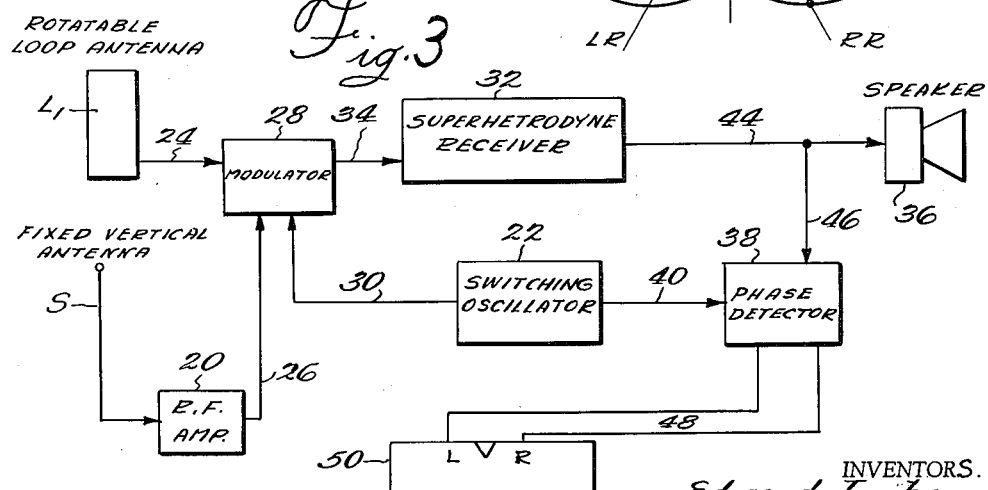
FIG. 3 is a block diagram of the invention showing the main parts of the apparatus and referred to in explaining their function.

With the general operation of the apparatus in mind, attention is now invited to the block diagram of FIG. 3 which illustrates the parts of the invention which are combined to achieve the desired functions described.

The block diagram illustrates the independent antennas comprising the fixed vertical antenna or sensing antenna S and the rotatable ferrite core antenna which will hereinafter be referred to as loop antenna $L_1$. Through the use of an R.F. amplifier 20 the signal from the vertical antenna S is amplified sufficiently to enable the signal to be utilized in the apparatus notwithstanding the fact that the vertical antenna is a very small fraction of a wave length in physical dimensions. In the commercial version, the actual length of the vertical antenna was only two feet, easily formed of very light wire and readily transported. It was mounted on a plug and readily removed.

An oscillator which operates at an audio frequency serves as an electronic switch. This is indicated at 22 and the signals from the rotatable loop antenna $L_1$ and the output of the R.F. amplifier 20 are applied through the paths indicated generally at 24 and 26 to the modulator 28 where they are mixed and their phase relation periodically reversed at the audio rate controlled by the switching oscillator 22. The oscillator affects the modulator through the connection designated 30.

In the actual apparatus, the oscillator 22 and modulator 28 are substantially a single stage, the mixing being done through the medium of transformer coupling means.

The output of the modulator 28 is applied to the receiver 32 as indicated by the connection 34. The receiver is a superheterodyne receiver using a local oscillator, and the output of the receiver is used to drive a speaker 36, the output of the receiver simultaneously being applied to a gated phase detector 38. The detector 38 is arranged to switch the phase of the rectified receiver output in synchronism with the swtiching of the sense and loop antennas, by a suitable connection indicated symbolically at 40, the channel from the receiver 32 to the speaker 36 being designated 44, with the application of the receiver output to the gated phase detector 38 being effected through a channel 46. The output of the gated phase detector is applied through the channel 48 to a left-right heading indicator 50.

All of the described parts of the apparatus which are shown in the block diagram are contained in the single unit shown in FIG. 1, which in a commercial version is a simple box of less than 400 cubic inches volume, weighing approximately six pounds including the weight of all necessary batteries. The enclosure of the device of FIG. 1 comprises a metal cabinet or housing 52 which has a dome-like rectangular antenna housing 54 on its top wall which encloses the ferrite loop antenna $L_1$. The housing 54 is obviously formed of other than a shielding material, and hence is preferably molded from some rugged water-impervious plastic material, such as synthetic resin. The ferrite core antenna is mounted on a rotatable disc 56 of wood or plastic having a compass rose 58 marked about its peripheral edge, a segment of about 50° of which protrudes through a window 60 formed adjacent the top of the front face of the cabinet 52. A portion of the edge of the disc 56 may be roughened or extend beyond that part which is marked with the compass rose 58 to enable the operator to manipulate the same for rotation of the disc.

Immediately below the window 60 is a narrow slot 62 behind which there may be disposed a neon bulb or other means for indicating battery strength. The window 64 below the slot 62 enables the forward portion of a simple balance galvanometer 68 to protrude. As will be seen, this galvanometer is marked with a pair of parallel vertical lines in its center, and the letters L and R to the left and right thereof. The needle 72 is arranged to traverse the vertical arcuate scale, which is preferably blank, except for a mark in the form of a dot or other indicia adjacent the scale ends to show the maximum extent of movement of the needle 72. The screw shaft 74 immediately below the meter 68 controls a suitable meter centering resistor which will be mentioned. The knob 75 operates a meter sensitivity resistor.

The left side of the apparatus housing 52 has a knob 76 which operates a two position band switch Sw-1, a tuning control knob and dial 78 which varies the tuning condensers of the receiver, and conventional fine movement knob 80 engaging the dial 78. Any friction or gear arrangement to achieve fine tuning may be used.

The right side of the front face of the housing 52 has a control knob 84 adjacent the top thereof, which has three positions, as shown, although only the outer two are essential. These three positions are marked "Antenna," "D.F. Check" and "D.F." The knob is connected with a three position switch which will be described as Sw-3 in the circuitry. The D.F. Check position need not be discussed at this point, but suffice it to say that it provides means for assuring accurate tuning of stations for direction finding.

Below the knob 84 may be seen another knob 86 which operates a combined volume control and off-on switch Sw-4. During direction finding, the volume control functions along with knob 75 as added control of meter sensitivity. The other control 88 on the bottom of the right hand side is a simple toggle or slide operating a noise limiter switch Sw-2, which is not essential but of convenience.

The function of the apparatus will best be understood by examining the operation of the device upon various conditions of the switches, but this is best done by geneally describing the circuit. In FIG. 6 the circuit is shown in conventional form, with the parts thereof marked according to a fairly consistent scheme in which most inductive reactors are designated L-1, L-2, etc., capacitors are designated C-1, C-2, etc., resistors are designated R-1, R-2, etc., transformers T-1, T-2, etc., switches are designated Sw-1, Sw-2, etc., diodes or rectifiers are designated D-1, D-2, etc., vacuum tubes are designated V-1, V-2, etc., and the two transistors used are designated TR-1, TR-2.

Commencing the explanation with the switches connected as shown in the drawing, the following conditions prevail:

Switch Sw-1 operated by the knob 76 is on Broadcast
Switch Sw-2 operated by control 88 is Off
Switch Sw-3 operated by knob 84 is on Antenna
Switch Sw-4 operated by volume control knob 86 is Off.

Note on the right hand side of the drawing that the switch Sw-4 has two ganged arms 101 and 102 which are adapted to be moved into engagement with the contacts 103 and 104 respectively and when the switch Sw-4 is closed, the circuits of two battery power sources are completed. One of these, marked B is the plate voltage supply and the other marked A is the filament supply for the vacuum tubes. The filament supply is shown terminating in the arrows $x$ and $y$, which merely signifies that the identical arrows $x$ and $y$ of the vacuum tubes V-1, V-2, V-3 and V-4 are also connected to the same supply in parallel. The battery shown may have a low voltage, such as 1.5 volts, and each of the tubes has a 1.5 volt filament, except for the tube V-4 which has a normally 3 volt filament but can be connected as shown to operate on 1.5 volts.

The B supply is also a battery, which for the particular circuit illustrated had a potential of 90 volts. The negative side of the B supply is connected through a conductor 105 through a voltage dropping resistor R-16 to a common or ground lead 106 so that the negative side of B is actually below ground potential. A condenser C-31 is connected from arm 101 to ground. The purpose for this is to provide a low impedance by-pass for signal frequencies. The positive side of the B supply connects through the contact 103 and the arm 101 of switch Sw-4 to a conductor 107 which supplies the potential to the various plates, transistors, etc. The act of closing the switch Sw-4 energizes the entire apparatus.

Commencing first at the left hand end of the diagram of FIG. 6, the sense antenna S, which as previously explained is in the form of a short vertical wire, is coupled to the device through a coupling condenser C-7 and its signal is intended to be amplified by the transistor TR-1, but only on condition that the transistor achieves its bias from the B supply. We may trace the circuit, however, and it will be noted that the condenser C-7 connects to the base 108 and to the collector 109 through a high ohmage resistor R-1. The emitter 110 is in the lead 111 which connects with the lead 112 that in turn connects with the contact 11 of the switch Sw-3. This contact being open on Antenna and D.F. Check positions, in these positions the sense antenna S is not used and the R.F. amplifier is not energized. The voltage for the transistor TR-1 is normally applied through the resistors R-21 and R-2, the latter resistor also serving as the load across which the signal appears for use during the direction finding condition of the apparatus.

The signal output of the transistor TR-1, when the latter is energized is coupled through the capacitor C-8 to the center tap of the primary winding 113 of the air core transformer T-2. This signal is applied to the primary from the center tap to either the top or the bottom of the primary winding 113, due to the operation of the modulator 28 and hence the phase of the signal applied to the secondary winding 114 will be reversed periodically. The signal from the secondary winding 114 of the transformer T-2 combines with the signal from the loop antenna L-1 by way of the conductor 115 and is applied directly to the grid 120 of the tube V-1 which is the R.F. amplifier of the receiver 32. Obviously if there is no signal from the sense antenna S, there will be no addition to the signal induced in the loop antenna L-1. To improve the reception by the receiver 32 during the period that the switch Sw-3 is on Antenna position, the secondary winding 114 is short circuited by means of the conductor 116, the conductor 117, the contact 1 of switch Sw–3, the slider member A of said switch, the wiper contact 4 of said switch, and the conductor 118. The conductor 116 is an extension of the AVC lead 119 which provides an R.F. ground through the condenser C–17 applied to the bottom of the secondary winding 114 of the transformer T–2.

Short circuiting the secondary 114 of the transformer T–2 raises the Q of L–1 and T–1 and hence gives the receiver greater sensitivity for reception. The winding T–1 is a loading coil for use with the antenna loop L–1 when used for standard broadcast frequencies. The signal from the antennas is applied to the grid 120 of the tube V–1 through the arm 121 and contact 1 of switch Sw–1 which, as shown, has four arms 121, 122, 123 and 124 all ganged to swing together. The switch is for adjusting the tuned circuits of the R.F. input to the receiver and the tank circuits of the local oscillator of the receiver 32, so that the conditions are optimum for the particular band of frequencies being used. As noted, when the arms are all up, i.e., respectively on the contacts 1, 3, 5, and 7 the conditions are optimum for the broadcast band. The knob 76 of FIG. 1 is on Bdcst. When the arms are moved to their second position (knob 76 turned counter-clockwise to Beacon) they contact the contacts 2, 4, 6, and 8 and the conditions are optimum for reception of signals on the beacon frequencies.

The condenser C–5 is the principal R.F. tuning condenser, being in parallel with a padding condenser C–4 and an additional condenser C–1 used only on beacon frequencies when at the same time the winding T–1 is removed from the circuit. The local oscillator tuning condenser C–6 is ganged to track with the condenser C–5, both being rotated by the manipulation of the dial 78. The oscillator condenser C–6 is in parallel with a padding condenser C–3. On Bdcst, the frequency of the local oscillator is controlled by the feedback through the inductive element L–2, one winding 125 of which is connected to ground through the contact 7 coupled to the oscillator grid 126 through the coupling condenser C–10 in parallel with the tuning condenser C–6 by means of the lead 127. The other winding 130 of the inductive element L–2 connects from the B+ conductor 131 to the contact 5 of the switch Sw–1 by way of the arm 123, lead 132 to the screen grid 133 of the tube V–1. The resistor R–6 provides self-bias for the oscillator portion of the tube V–1. Note that the tube V–1 is a pentagrid converter tube.

When operating on Beacon frequencies, the inductor L–2 is out of the circuit, and in its place is the inductor L–3. The grid winding is 135 which has a padding condenser C–2 in parallel therewith and the screen-grid winding is 136.

The signals which are combined in the tube V–1 are converted into signals modulating the intermediate frequency as conventional in superheterodyne receivers, and the signal output of tube V–1 appears at its plate 137, is applied to the primary 138 of the first I.F. transformer T–3, which is in parallel with a condenser C–11. The secondary winding 139 has the condenser C–12 in parallel therewith and the signal output is applied to the grid 140 of the tube V–2, a sharp cut-off I.F. amplifier tube. The condenser C–13 is an R.F. by-pass for the secondary 139 and the resistor R–7 is a contact potential bias resistor for the grid circuit of the tube V–2. The screen grid 141 obtains its potential from the B+ conductor 107 through the dropping resistor R–22 and is bypassed to ground through the condenser C–18. Output from the tube V–2 is applied from the plate 143 to the primary 144 of the I.F. transformer T–4 which is in parallel with a condenser C–19 and which connects with the B+ lead 107 through the conductor 145 to apply plate potential to the tube V–2. The secondary winding 146 with its parallel capacitor C–20 operates into the diode plate 147 of the tube V–3. This latter tube is a diode-pentode mixer whose purpose is to detect the signal output of the I.F. section of the receiver, eliminating the I.F. from the signals and also amplify the audio signals.

The resistor R–9 which connects from the bottom end of the secondary 146 to ground is the detector load resistor across which the audio output signal appears from the detector, comprising the diode section of the tube V–3. A portion of the signal from the top of the resistor R–9 comprises the AVC voltage, and connects through the resistor R–8 to the lead 119. When operative, it is applied directly to the grid 120 as may be traced through the circuit. The resistor R–9 is also the volume control, operated by the knob 86, and the signal from the wiper is applied through the lead 148 through a diode D–1 biased by the voltage divider R–11 and R–10 with center by-passed to ground through capacitor C–22, to the coupling capacitor C–23 to the grid 149; or by-passes the diode D–1 going directly to the grid 149 through the coupling condenser C–23. The diagram shows this latter condition. The switch Sw–2 controls this arrangement, the arm 150 being movable by the control member 88 (FIG. 1) to either of positions 1 and 2, in the latter of which the noise peaks in the audio signal are clipped prior to amplification in the pentode section of the tube V–3.

The signal output from the tube V–3 is applied from the plate 151 to the grid 152 of the power amplifier pentode V–4 through a coupling capacitor C–26. The portion of the circuit which is enclosed in the dotted rectangle 153 is known commercially as an "audio coupling plate" and has numerous resistors R–13, R–14, R–15 and capacitors C–24 and C–25 whose purpose it is to supply the proper potential and by-pass paths to the plate 151, screen grid 154 and the bias to the grid 152. The output of the pentode V–4 is applied from the plate 156 to the primary winding 157 of the output transformer T–5 whose secondary winding 158 drives a permanent magnet speaker 159 the cone of which is located immediately beneath the louvres 160 shown on the side of the cabinet 52 in FIG. 1. The screen grid 161 receives its potential from the B+ lead 107 and is by-passed to A.C. ground through the capacitor C–29. The output of the tube V–4 may be taken through a condenser C–30 to a jack 162 to enable the use of a headphone of impedance different from that of the speaker coil.

The output of the tube V–4 is applied in series with the secondary winding 157 by way of the conductor 164 to the primary winding 165 of the transformer T–6, which is parallel with a condenser C–28 the purpose of which is to provide a smoothing effect to the signal wave.

The transformer T–6 is the phase detector transformer of the apparatus, the phase detector being designated 38. Note that the top of the phase detector transformer secondary 165 is connected to the B+ conductor 107 and thus supplies the potential to the plate 156 by this devious route. The secondary 166 of the transformer is connected through diodes D–2 and D–3 in its respective leads across the meter 68 which is in series with a resistor R–19 which is adjustable by knob 75 on the face of the cabinet 52 to provide varying meter sensitivity. The condenser C–27 across the meter is for the purpose of keeping A.C. out of the meter 68, which is a D.C. meter, and the meter is centered by the resistor R–20 controlled by the control member 74 (FIG. 1). It will be appreciated that the meter 68 is connected across the balance terminals of a bridge 50 comprised of the opposite sides of the resistor R–20 and the secondary winding 166 operating through its diodes D–2 and D–3. When signals are applied to the bridge or detector and switched from branch to branch, if the signals are equal in amplitude, the meter will stay at zero, but if one signal is greater than the other, the meter needle 72 will swing one way or the other depending upon which of the signals is the greater.

The heart of the apparatus is a semi-conductor energized oscillator 22 which uses a transistor TR–2 referred to in the claims as a three-element amplifier, whose base is biased by the resistor R–5 connected to the B+ lead through the resistor R–21, and whose collector 168 connects to the winding 169 of the oscillator transformer T–7, the secondary winding 170 of which is fed back through the capacitor C–14 to the base 167. The emitter 171 is connected to A.C. ground, and a large condenser C–15 across the base and emitter provides good wave form to the resulting oscillations. These oscillations occur from the center tap of the transformer secondary 170 to the conductors 172 and 173 and hence, because of the diodes D–4 and D–5, first one of these conductors and then the other will be grounded. The secondary winding 170 is termed a three terminal impedance in the claims. The capacitor C–40 serves to provide an A.C. ground for winding 170. The resulting current flows from the lead 175 through one or the other of the resistors R–3 and R–4 and thereby reverses the phase of the output of the transformer T–2 with each half cycle of oscillation. The resistors R–3 and R–4 may be considered a load impedance for the oscillator 22, having its center 175 at A.C. ground. Since these same leads 172 and 173 also connect to the detector 38, and into the bridge 50, the same phenomena occurs there in synchronism, and hence, while the signal output of the sensing antenna S is switching between phases, the input to the bridge is also switching between signals received from side to side. Equal signals received by antennas on reversals of phase will result in equal signals in the meter 68.

Considering now the switch Sw–3, when turned to its second position, marked D.F. Check, it grounds the AVC through resistor R–17 by connecting the wiper 4 through the slider member A and contact 2 through the resistor R–17. The contact 1 is now open and the secondary 114 is no longer shorted, but now is included in the input circuit to the tube V–1. Since the lead 112 is still open, the oscillator 22 and the R.F. amplifier TR–1 are inoperative, and there is no appreciable signal from S. There being no AVC the receiver can be more finely and accurately tuned for the purpose of direction finding in this condition.

In the next position of Sw–3, the AVC is still grounded through the resistor R–17, and the lead 117 is still open, leaving the transformer T–2 available for signals from S. The neon tube N–1 is now connected in series with the dropping resistor R–18 to ground through the contact 11, slider member C and wiper 12 and ignites to show if there is sufficient B+ potential for efficient operation. With this connection established, the lead 112 is also grounded and the oscillator 22 and the R.F. amplifier TR–1 are rendered operative. The oscillator at a low audio rate of the order of 100 cycles per second to switch the phase of the sensing antenna relative the phase of the loop antenna L–1 thereby applying the signals received by these antennas to the receiver in the arrangement described in connection with FIG. 6. The resulting output of the receiver when applied to the meter 68 through its bridge circuit 50 and the detector arrangement 38 will cause the meter needle 72 to swing one way or the other depending upon the relative amplitudes of the signals when 180° out of phase with one another.

The apparatus operates as previously described to avoid the ambiguity of equal signals from a source ahead and a source to the rear of the apparatus. In order best to illustrate how this is done, the procedure which the user goes through in order to use the apparatus for its several functions will now be described.

The housing 52 contains everything which has been described and illustrated herein including, not only the batteries A and B but also the loud speaker 36 so that the single switch Sw–4 ganged with the volume control R–9 is effective to energize the entire apparatus through the knob 86. In this condition, with the knob 84 turned to Antenna position, the switch Sw–3 is as shown in FIG. 6. The apparatus in this condition functions as a sensitive receiver because the oscillator 22 is inoperative, the R.F. amplifier 20 is inoperative and provides no signal from the vertical antenna S, the secondary winding 114 of the modulator transformer T–2 is short circuited, and the only signal which is applied to the receiver 32 is that obtained from the loop or ferrite core antenna $L_1$. The signal is improved because of the short-circuiting of the transformer secondary T–2 due to increased "Q" of the antenna $L_1$. The AVC bias circuit is inoperative under these conditions. Either beacon or standard broadcast frequencies can be received depending upon the position of the switch Sw–1. Obviously, any desired bands of frequencies can be built into the equipment, for use with other than, or in addition to the broadcast and beacon frequencies.

Since the ferrite core antenna $L_1$ is now being used, its response pattern is as indicated by the figure 8 pattern 12 of FIG. 1. The antenna is highly directive, but the response is bi-lateral, with two maxima and two minima. Rotating the compass rose 58 not only will enable optimum signal to be obtained, but will enable a bearing to be taken on the station whose signal is being received. Obviously the bearing will be that which is read on the compass rose at a minimum signal or a bearing 180° from that. Minimum signal is used because it is sharper.

When using the apparatus on Antenna position just described, no particular precautions need be observed. The meter 68 provides no pertinent information and hence its sensitivity can be adjusted to minimum. The vertical antenna S need not be in position, and hence the wire rod may be pulled out of its socket as shown in FIG. 1. There is a simple male plug 180 secured to the bottom of the antenna S which removably engages a female socket 181 mounted on the top of the housing 52. The signal output is heard either by the use of the speaker or a pair of earphones plugged into the jack 162, conveniently located on the left side of the housing 52 and not seen in FIG. 1.

If the user wishes to home or obtain the direction of a station, he turns the knob 84 through the D.F. Check position to D.F. In the D.F. check position the AVC is grounded for sensitivity of radio reception, which may indicate the ability of a station to be used for direction finding. On this, as well as the Antenna position, the noise limiter switch Sw–2 may be used if desired, but of course this is not essential to the principal purposes of the device.

In D.F. position, the neon lamp N–1 should ignite and be visible through slot 62 to indicate battery strength. The noise limiter switch Sw–2 should be "Off" to enable the receiver 32 to pass signals whose amplitude is truly representative of the input to the receiver. The antenna S should be plugged in.

The desired station is carefully tuned in on Antenna and D.F. Check positions consecutively prior to turning the knob 84 to D.F. The volume control 86 is then turned to provide a minimum signal and the control 74 is used to center the needle 72 of the meter 68. With the compass rose 58 at zero, and the device aligned with the front and rear axis of the craft, as the sensitivity of the meter 68 is increased, either through the increase of volume or sensitivity by control 75, or both, the needle 72 will swing to the right or the left. The amount of deflection is kept within the limits of the dots at the ends of the arcuate scale of the meter. This indicates the position of the source of the signal, that is, whether it is right or left of the craft.

In most cases, the approximate location of the station will be known, especially if a magnetic or gyro-compass is also available, and the approximate position of the craft is known. In unusual circumstances, where the operator is uncertain as to whether the station is ahead or to the rear, as he heads the craft forward and turns in the apparent direction of the signal source, should his action result in the needle tending to swing back to center, he knows that he is headed correctly. If the needle swings further away from center he knows that his bearing is in error by 180° and he heads in the opposite direction.

For position fixing, the same procedure is followed as in homing, except that the bearing of stations is obtained by rotating the compass rose to center the needle and reading the bearing of the station. This procedure is too well-known to require detailed explanation, but it is emphasized that the apparatus of the invention is ideally suited for these types of procedures. Again the housing must be carefully aligned with the front to rear axis of the craft.

FIG. 2 illustrates the compact construction of the apparatus. Only the mounting for the compass rose and the meter are shown. As previously explained, the dome-like rectangular housing 54 is formed of plastic or some other non-shielding material, and the same is secured to the top wall of the housing 52 by fastening means such as lugs 190 and screws 191. The ferrite core 192 of the antenna L–1 is inserted in rubber grommets 193 which in turn are firmly mounted in the bifurcated arms 194 of a bracket 195 that extends through a hole or recess 196 formed in the top wall of the housing. The bracket 195 has a rather narrow U-shaped base 197 which enters the opening, and the bottom transverse connecting portion 198 is secured to the top of the disc 56 aligned with the axis thereof. The disc 56 and the compass rose 58 are held together in any suitable manner, and for example, they could be formed of an integral inverted cup-shaped member, the rose portion being merely a narrow depending annular ring held to the bottom of the disc 56 about the periphery thereof. The compass rose (referring to the entire assembly) is provided with center spindle 199 which extends entirely through the same, preferably being engaged through a suitable opening in the portion 198 to assist in holding the same upon the disc 56 and clamped by suitable screw-threaded nuts. The spindle 199 is removably engaged in a thrust and support bearing 200 which has depending return bent prongs 201 and 202 of resilient metal, engaging in suitable annular grooves or the like provided on the elongate extension 203 of the spindle 199.

The spindle 199 and support bearing 200 of the structure are quite unusual, although constructed from conventional components. They are novel in that these components were never intended to be used as spindles and bearings, but ideally serve this purpose in the apparatus. The spindle 199 of the structure illustrated is actually a simple telephone or speaker plug which has been adapted for use in this device, while the bearing 200 is a jack for the reception of the plug. The jack is mounted upon the arm 204 of a Z-shaped bracket 205 which in turn is secured to the body 206 of the meter 68 in a manner to be described. The wires 207 and 208 of the coil L–1 may conveniently be connected to electrical terminals of the plug 199 and be picked up from the conductive rings by the prongs 201 and 202 or any other prongs which may be provided for other electrical taps or connections, all in the same manner that electrical connections are established through plugs and jacks. Thus the prongs 201 and 202 as well as any others that may be used, besides serving electrical purposes support the entire compass rose assembly rotatably, the rotation being stabilized and guided by virtue of a segment of the compass rose and disc protruding from the front wall through the window 60.

Depending upon the frequencies being received, the sensitivity of the equipment, the shielding, the strength of available signals, this method of transmitting the signals may be varied as shown. The wire 208 is connected through the jack and plug assembly, but the other wire 207 is led through the body of the compass rose and is soldered to an annular slip ring 209 which is secured to the bottom of the rose 58. A wiper member 210 which is secured to an insulating support bar 211 carried by the Z-shaped bracket 205 provides the pick-up contact. The back wall 212 of the housing 52 is removable and a section 213 out of the rear of the top wall may also be removable to enable the compass rose and its antenna L–1 to be assembled with the apparatus.

Obviously other means for rotatively supporting the compass rose and its antenna and leading the electrical terminals of the antenna to the interior of the housing may be used, but the rugged and simple structure specifically described are believed highly desirable and economical.

The meter 68 is arranged immediately below the rose, and as will be seen, only the forward arcuate segment of the meter protrudes through the window 64 in the front wall of the housing 52. The remainder of the movement or body 206 of the meter is relatively thin in its vertical thickness and has a substantially rectangular configuration in horizontal plan, extending back of the front wall of the housing 52 to a point somewhat past the axis of the compass rose assemblage. A vertical bracket member 214 has a flanged top edge 215 which engages over the top rear edge of the meter body 206 and a pair of right angle bent inwardly extending members 216 integral with opposite lateral edges that extend beneath and firmly support the end of the meter body 206. At its forward end, there is a channel member 217 which has laterally extending spread ears 218 that overlie the rear of the front wall of the housing 52. (Several layers of insulating material 219 may be provided on the rear of the front wall for support, insulation and the like.) The same screws 220 that support the escutcheon plate 221 engage the ears 218 and rigidly hold the meter 68 in place. The Z-shaped bracket 205 is thus secured to the top of the meter body 206 by screws and bolts 222 that not only pass through the body 206 but also engage through the channel member 217 on the bottom thereof and on opposite edges of the meter.

It is believed that the details have been fully set forth in sufficient detail to enable an appreciation of the invention. In order further to render this disclosure complete, a commercial version of the apparatus was constructed in which circuit constants and elements were used as set forth hereinafter. Not all values and details are given, those omitted being readily worked out by the artisans skilled in this field.

Tubes:
  V–1 _____ 1R5
  V–2 _____ 1U4
  V–3 _____ 1U5
  V–4 _____ 3V4

Transistors:
  TR–1 _____ 2N35
  TR–2 _____ 2N185

Capacitors:
  C–7 _____microfarads__ .002
  C–8 _____do____ .002
  C–9 _____do____ .01
  C–10 _____micromicrofarads__ 47
  C–13 _____microfarads__ .0047
  C–15 _____do____ 20
  C–16 _____do____ .25
  C–17 _____do____ .047
  C–18 _____do____ .01
  C–21 _____micromicrofarads__ 100
  C–22 _____microfarads__ .001
  C–23 _____do____ .0015
  C–27 _____do____ 200
  C–28 _____do____ .1
  C–29 _____do____ .0015

Capacitors—Continued

| | | |
|---|---|---|
| C-30 | do | .005 |
| C-31 | do | 6 |

Resistors:

| | | |
|---|---|---|
| R-1 | ohms | 820K |
| R-2½ | do | 47K |
| R-3 | do | 1K |
| R-4 | do | 1K |
| R-5 | do | 10K |
| R-6 | do | 47K |
| R-7 | megohms | 10 |
| R-8 | do | 22 |
| R-9 | do | 1 |
| R-10 | do | 1 |
| R-11 | ohms | 18K |
| R-12 | megohms | 10 |
| R-16 | ohms | 270 |
| R-18 | do | 33K |
| R-19 | do | 1.8K |
| R-20 | do | 5K |
| R-21 | do | 33K |

The resistors not specified are screen dropping plate load and grid resistors. The capacitors not specified are tuning condensers whose values depend upon the frequencies desired to be received, padding condensers, coupling condensers, I.F. condensers, and the like. The inductances of the transformers and the inductors are values which need to be worked out on the basis of the frequencies handled.

The apparatus constructed as described was easily assembled, adjusted and aligned. The entire back 207 was removable giving ready access to all parts, tuning condensers, adjusting slugs, etc. The adjustments were not overly critical, the equipment was rugged and readily rendered water-resistant.

What it is desired to claim by Letters Patent of the United States is:

1. A portable radio direction finder which comprises, a housing having an omni-directional antenna mounted thereon, said antenna being non-resonant at one group of frequencies, a directionally responsive antenna rotatively mounted thereon for receiving said one group of frequencies and having a generally figure 8 response characteristic, a low frequency electronic switching oscillator in said housing, a tunable radio frequency receiver adapted to provide an audio frequency output, means in said housing combining the signal outputs of said antennas at any frequency in said one group of frequencies and applying the same to said receiver, said oscillator being connected to modulate said signal combining means to change the phase relationship between the signal outputs of said antennas at the frequency of said oscillator, a phase detector and a right-left indicator in said housing driven by said phase detector, the receiver output being connected to said phase detector, and a connection between said low frequency oscillator and said phase detector whereby the signal output of said receiver is connected to said phase detector in synchronism with the change of phase relationship between said signal outputs of said antennas.

2. A radio direction finder as claimed in claim 1 in which said omni-directional antenna comprises a vertical conductor whose physical length is substantially less than a quarter wave length of the radio frequency signals receivable by said receiver, and said direction finder has an R.F. current amplifier for amplifying the signal of said omni-directional antenna electrically interposed between said last mentioned antenna and said signal combining means.

3. A radio direction finder as claimed in claim 2 in which said amplifier comprises a transistor, and in which means are provided for rendering said transistor inoperative when it is desired to receive signals from said directionally responsive antenna only.

4. A radio direction finder as claimed in claim 1 in which said detector and right-left indicator comprise a transformer provided with a primary winding and a secondary winding, the latter winding having end terminals, said transformer having said receiver output applied across the primary winding thereof, the secondary winding of said transformer being connected into a bridge arrangement in parallel wtih a polarized meter and a balancing impedance, there being a pair of uni-directional current conducting devices, one each being connected in series with the respective end terminals of said secondary winding, and said connection from said oscillator being tapped into said secondary winding and said balancing impedance.

5. In a radio direction finder which comprises a sense antenna, a directive antenna, a receiver, a switching oscillator, a modulator comprising a transformer having the sense antenna and switching oscillator connected to the primary winding thereof and the directive antenna connected to the secondary thereof and together with said secondary connected to apply a signal to said receiver, means for using the receiver independently of the sensing antenna which comprises a multiple contact manual switch which in one position disables said oscillator and short circuits said primary winding, whereby to decrease the inductive effect of said primary winding upon said secondary winding and raise the "Q" of said secondary winding to improve the sensitivity of said directive antenna.

6. A structure as claimed in claim 5 in which an R.F. amplifier is provided between said sensing antenna and said primary and potential means are provided for energiznig said R.F. amplifier and oscillator including a ground return, and said one position of said switch opens the said ground return.

7. A structure as claimed in claim 5 in which the receiver has an A.V.C. circuit, and said one position of said switch renders said A.V.C. circuit operative, there being a second position of said switch wherein the R.F. amplifier and osciialtor are energized by completing their ground return, the secondary winding is connected to enable the signal output from said transformer to be mixed with the signal of said directive antenna, and the A.V.C. circuit is rendered inoperative.

8. In a radio direction finder which has a selectively directional antenna providing a first radio frequency signal from a source; an omni-directional antenna providing a second radio frequency signal from said same source; a right-left heading indicator; a proportional output phase detector; means for combining said signals; receiver means connected with said combining means for detecting the audio frequency component of said combined signals and applying said component to said detector; the phase detector being connected to said indicator for energizing the indicator with the output of said detector; the invention herein which comprises: a radio frequency transformer having primary and secondary windings, the secondary winding being at least a portion of said combining means, said selectively directional antenna being coupled with said combining means to apply said first signal thereto, said primary winding having end terminals and a center tap, said omni-directional antenna being connected between said tap and ground, an electronic oscillator having an output connected across the said end terminals but with a similarly polarized rectifier in each terminal, and means for applying the oscillations of said oscillator across alternate halves of said primary winding whereby effectively to alternately ground said end terminals so that the said second radio frequency signal is applied across alternate halves of said primary winding thereby inducing a phase-reversing signal in said secondary winding, and said output of said oscillator also being connected to said phase detector to provide a reference voltage to be compared with said audio frequency component to provide an output for driving said indicator.

9. A structure as claimed in claim 8 in which said electronic oscillator includes a potential supply one side of which is grounded and there is an R.F. amplifier in series with said omni-directional antenna between the said omni-directional antenna and the tap of said primary winding and said R.F. amplifier being also connected to said potential supply, means for rendering said oscillator and omni-directional antenna ineffective comprising switch means disconnecting the ground connection between the said oscillator and said R.F. amplifier.

10. A structure as claimed in claim 8 in which said radio direction finder has a potential supply one side of which is grounded, said oscillator includes a transistor having a connection to ground and a bias connection with said potential supply, an R.F. transistor amplifier is connected between said omni-directional antenna and said tap of said primary winding having a connection with said potential supply for obtaining bias and a ground return connection, means for disconnecting the ground return of said R.F. amplifier and oscillator to render the omni-directional antenna ineffective and disable said oscillator.

11. A structure as claimed in claim 8 in which said electronic oscillator includes a three-element amplifier device operating into a three-terminal impedance having a center terminal and two outer terminals, the two outer terminals comprising said output of said oscillator, the center terminal being at A.C. ground, and said oscillation applying means comprising an A.C. grounded center load impedance connected across the said end terminals of said primary winding with the center providing the ground return for said oscillator.

12. A structure as claimed in claim 8 in which said electronic oscillator includes a transistor and a transformer driven by said transistor, the transformer having an output secondary with a grounded center tap, the opposite end terminals of said secondary comprising said oscillator output, a center grounded impedance in parallel with said primary winding and separated from said oscillator output by said rectifiers.

13. In a portable radio direction finder adapted to be readily carried by the user from place to place, a housing completely containing the said radio direction finder and having a source of power therein, a receiver in the housing tunable over a band of radio frequencies, a proportional output phase detector in the housing, a right-left signal indicator in the housing energized by the phase detector, modulating means in the housing, an electronic oscillator synchronously driving the modulator and providing a reference signal to the phase detector, a vertical omni-directional radio frequency receiving antenna carried by the said housing, means coupling the receiving antenna with the modulating means to induce the signal from said antenna in said modulating means, a ferrite core antenna rotatively carried by said housing and also coupled with said modulating means to have its signal induced in said modulating means and combined with the signal from said vertical antenna, means applying the combined signal to said receiver, the modulating means including an inductor providing the coupling between said vertical antenna and said modulating means, and the oscillator being connected to said inductor for reversing the polarity of the last-mentioned coupling at the frequency of said oscillator so that the signal induced as a part of said combined signal and attributed to said vertical antenna is periodically reversed in phase relative the signal from said ferrite core antenna, said receiver having detecting means whereby the said combined signal is detected and means applying the detected output to the phase detector whereby the right-left indicator will indicate direction of the source of received radio frequency radiation.

14. A structure as claimed in claim 13 in which said housing has a rotatable compass rose mounted on a vertical axis for determining bearing, and said ferrite core antenna is secured to said rose to rotate therewith.

15. A structure as claimed in claim 13 in which a compass rose is rotatably carried by said housing.

16. A structure as claimed in claim 15 in which said rotatable ferrite core antenna and said compass rose are coaxially mounted and the ferrite core antenna is capable of manipulation from exterior of said housing.

17. A structure as claimed in claim 15 in which said ferrite core antenna and said compass rose are coaxially mounted and at least the ferrite core has a rotatable plug and socket connection with said housing enabling ready removal thereof.

18. In a radio direction finder which has a selectively directional antenna providing a first radio frequency signal from a source; an omni-directional antenna providing a second radio frequency signal from said same source; a right-left heading indicator; a proportional output phase detector; means for combining said first signal and a third signal derived from said second signal; a receiver having said combined signals applied thereto and detecting said combined signals to provide an audio frequency output and applying said output to said phase detector; a connection between said phase detector and indicator whereby to energize the indicator in a manner showing the direction of the source of radio frequency radiation received by said antennas; means for producing said third signal and enabling said indicator to give a deflection from a chosen point proportional to deviation of the said source from a predetermined direction defined by a chosen alignment of said directional antenna which would normally cause the indicator to define said chosen point, comprising: a radio frequency transformer having primary and secondary windings, one winding adapted to have said third signal produced therein and said winding comprising a part of said combining means, said selectively directional antenna having a connection with said combining means whereby to apply said first signal thereto simultaneously with the application of said third signal thereto, said second of said winding having two end terminals and a tap in the center thereof and said omni-directional antenna being connected to apply said second signal between said tap and ground, an electronic audio oscillator having two outputs, one output being connected to said phase detector to provide a reference signal therefor against which to compare the output of said receiver, the second output being connected across said second winding to the said end terminals, a uni-directional current conducting device interposed in each terminal between said oscillator and second winding, the successive alternations of said oscillator thereby effectively grounding said end terminals alternately and causing application of said second signal between said tap and alternate end terminals, the said third signal being induced in said one winding and having a phase reversing characteristic relative to said first signal at the frequency of said oscillator.

19. In a portable radio direction finder of the character described in which there is a directive antenna, a sense antenna, a modulator circuit, a receiver, a proportional output phase detector, an audio oscillator, and said oscillator synchronizes the modulator circuit with the phase detector, the receiver receives the modulated signal derived from the two antennas, detects the same and applies the resulting audio signal to said phase detector which in turn energizes the right-left indicator; the modulator circuit including an R.F. transformer having a primary winding and a secondary winding, the directive antenna being coupled with said secondary winding and connected to provide an input to the receiver, the primary winding having a center tap, there being an R.F. semiconductor amplifier stage between the sense antenna and the center tap, and the sense antenna being of substantially smaller electrical length than resonant for the frequencies adapted to be received therewith, the oscillator being connected to the ends of said primary winding and arranged to ground the respective ends alternatively to reverse the phase of the signal applied by said sense antenna through said amplifier to said primary winding.

20. A structure as claimed in claim 19 in which said amplifier stage comprises a transistor having the sense antenna connected to the base, the collector being coupled to said center tap, and the emitter being at R.F. ground.

21. A portable radio navigation device capable of giving right and left indications of the source of R.F. radiation, showing the deviation of the source from the normal alignment of the device, and resolving the ambiguity of front-rear location of said source, which comprises a housing readily carried by the user for association with a sense antenna of electrical length substantially less than required to resonate at the frequency of said R.F. radiation, a loop antenna, a radio receiver in said housing including means to detect R.F. signals having A.F. components and producing an A.F. output, an electronic oscillator in said housing having an A.F. output, R.F. mixing circuit in said housing including tuned R.F. elements having said loop antenna coupled thereinto and said mixing circuit arranged to operate into said receiver to apply to said receiver the mixed signals existing in said mixing circuit, a proportional phase detector in said housing having both the A.F. outputs of said oscillator and receiver applied thereto for comparison to produce a D.C. output polarized to provide right-left sense and of a value proportional to said deviation, an R.F. transformer in the housing having an inductive coupling with said mixing circuit and having said oscillator output connected thereto, an R.F. current amplifier stage in said housing providing a connection from said sense antenna to said R.F. transformer and the oscillator reversing the phase of said connection at the frequency of said oscillator, a right-left meter mounted to said housing and connected with said phase detector to have its pointer deflect according to the D.C. output of said detector.

22. A device according to claim 21 in which said housing also has an audio detector connected with said receiver to enable the A.F. of said source to be heard by the user while navigating with said device.

23. In a portable radio direction finder adapted to be readily carried by the user from place to place, a housing completely containing the said radio direction finder and having a source of power therein, a receiver in the housing tunable over a band of radio frequencies, a proportional output phase detector in the housing, a right-left signal indicator in the housing energized by the phase detector, modulating means in the housing, an electronic oscillator synchronously driving the modulator and providing a reference signal to the phase detector, a vertical omni-directional radio frequency receiving antenna carried by the said housing, means coupling the receiving antenna with the modulating means to induce the signal from said antenna in said modulating means, a ferrite core antenna rotatively carried by said housing and also coupled with said modulating means to have its signal induced in said modulating means and combined with the signal from said vertical antenna, means applying the combined signal to said receiver, the modulating means including an inductor providing the coupling between one of said antennas and said modulating means, and the oscillator being connected to said inductor for reversing the polarity of the last-mentioned coupling at the frequency of said oscillator so that the signal induced as a part of said combined signal and attributed to the one said antenna is periodically reversed in phase relative to signal from the other of said antennas, said receiver having detecting means whereby the said combined signal is detected and means applying the detected output to the phase detector whereby the right-left indicator will indicate direction of the source of received radio frequency radiation.

References Cited in the file of this patent

UNITED STATES PATENTS

| | | |
|---|---|---|
| 1,666,480 | Zillger | Apr. 17, 1928 |
| 1,696,928 | Squire | Jan. 1, 1929 |
| 1,919,043 | Roth | July 18, 1933 |
| 2,155,492 | Kemp et al. | Apr. 25, 1939 |
| 2,171,432 | Hicks | Aug. 29, 1939 |
| 2,198,445 | Wesselink | Apr. 23, 1940 |
| 2,321,478 | Freeman et al. | June 8, 1943 |
| 2,324,548 | Wheeler | July 20, 1943 |
| 2,420,395 | Greene | May 13, 1947 |
| 2,438,680 | Polydoroff | Mar. 30, 1948 |
| 2,445,786 | Libby et al. | July 27, 1948 |
| 2,485,578 | Earp et al. | Oct. 25, 1949 |
| 2,840,814 | Hemphill et al. | June 24, 1958 |

FOREIGN PATENTS

| | | |
|---|---|---|
| 259,499 | Switzerland | Jan. 31, 1949 |
| 493,213 | Belgium | May 2, 1950 |
| 787,653 | Great Britain | Dec. 11, 1957 |

OTHER REFERENCES

Electronics, October 1935, pp. 7, 8, 9, 10 and 29.

QST, August 1940, pp. 19–23, 88, 90.

"Transistor Electronics," by Lo, Endres, Zawels, Waldhauer and Cheng, September 1955, pp. 93–99, Prentice-Hall, Inc., Englewood Cliffs, N.J.